Nov. 28, 1961  O. SCHUELLER  3,010,219
ZERO GRAVITY SENSOR

Filed Feb. 2, 1960  3 Sheets-Sheet 1

INVENTOR.
OTTO SCHUELLER

BY
ATTORNEY

AGENT

Nov. 28, 1961 O. SCHUELLER 3,010,219
ZERO GRAVITY SENSOR
Filed Feb. 2, 1960 3 Sheets-Sheet 2
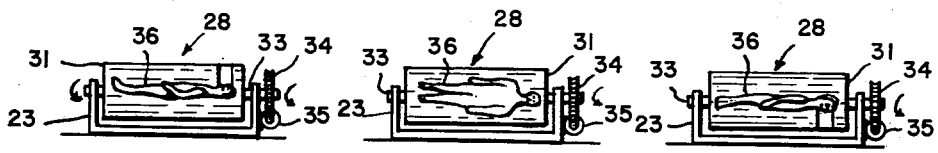
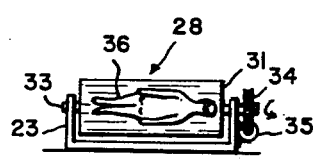
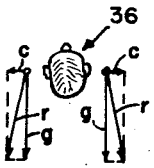
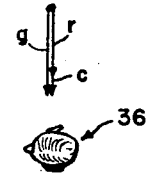
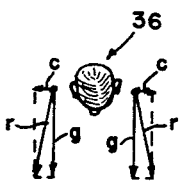
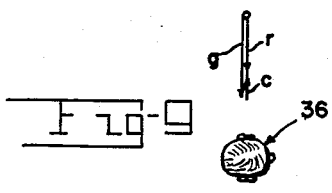
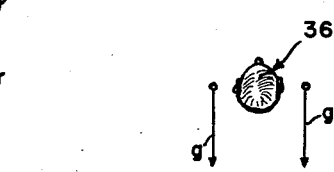
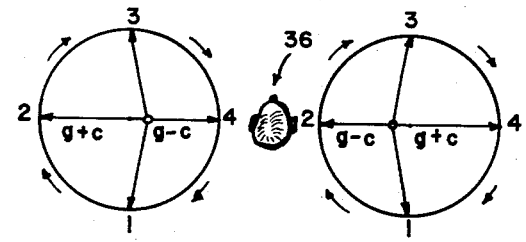
INVENTOR.
OTTO SCHUELLER
BY
ATTORNEY
AGENT Nov. 28, 1961  O. SCHUELLER  3,010,219
ZERO GRAVITY SENSOR
Filed Feb. 2, 1960  3 Sheets-Sheet 3
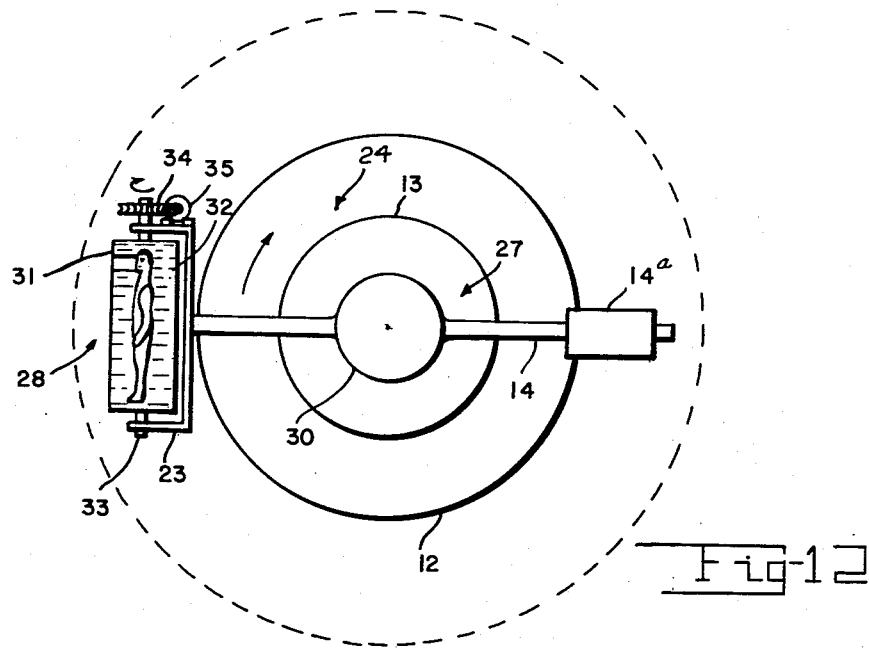
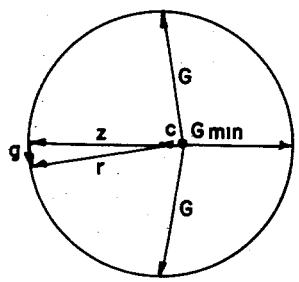
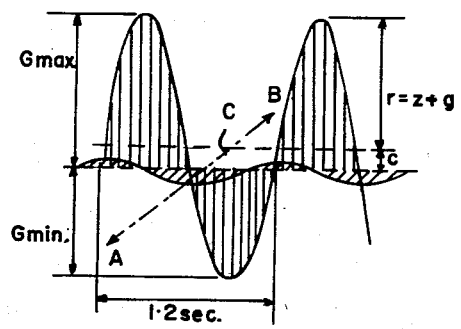
INVENTOR.
OTTO SCHUELLER
BY
ATTORNEY
AGENT

United States Patent Office 3,010,219
Patented Nov. 28, 1961

3,010,219
ZERO GRAVITY SENSOR
Otto Schueller, Dayton, Ohio
Filed Feb. 2, 1960, Ser. No. 6,329
12 Claims. (Cl. 35—12)
(Granted under Title 35, U.S. Code (1952), sec. 266)

The invention described herein may be manufactured by and for the United States Government for governmental purposes without payment to me of any royalty thereon.

This invention relates generally to the simulation of certain flight conditions normally encountered at extreme altitudes outside the earth's atmosphere and, more particularly, to a simulator device for simulating the hazards of space flight.

The first unmanned satellites already orbiting around the earth are a positive indication of a new era of space flight. Thus, it is now apparent that the long period of time of research and development previously thought necessary in the normal course of events in order to achieve the ultimate goal of manned space flights both in orbit around the earth and in interplanetary travel has now been substantially reduced due to the rapid developments and accomplishments of the most recent past. Since the time in which manned space vehicles and satellites will be launched into orbit around the earth as well as in interplanetary travel to the nearest planets is all but present, relatively speaking, it is imperative that a number of problems involving the effect both on man and equipment of the various environmental conditions to be encountered in outer space must be studied and a solution thereto effected. One of these problems involves the effect of zero gravity or weightlessness which will undoubtedly occur during orbit around the earth and while in certain phases of interplanetary travel. The latter problem, of course, makes it essential that a test device be developed which can satisfactorily simulate or at least approach the simulation of zero gravity and the effect thereof on man. At the present time, however, the only known approach to the simulation of zero gravity has occurred during aircraft flights while in a ballistic arc in a vertical plane wherein the centrifugal force acting on the pilot has momentarily equaled the force of gravity. This latter operation has actually produced a zero gravity or weightlessness condition for periods up to approximately forty seconds. It was found that this condition of zero gravity or weightlessness produced an effect on the inner ear resulting in a tendency towards disorientation of the individual concerned. Naturally, this condition of disorientation will be greatly increased during certain phases of prolonged space flight and, accordingly, it becomes apparent that, although individuals will, of course, vary in their reaction thereto, many will undoubtedly become seriously affected thereby provided no method or no mechanism is developed whereby this disorientation effect is either eliminated entirely or substantially reduced.

A primary object of the present invention, therefore, is to provide a zero gravity sensor device adapted to submit and test the reactions of man to certain unusual effects and sensations of space flight and combined with another device to counteract the forces normally effected thereby when acting alone.

Another object of the invention lies in the utilization of a zero gravity simulator device approaching the simulation of zero gravity on man and thereby testing the effect thereof on the inner ear.

Another object of the invention is to utilize a combined zero gravity and centrifuge device adapted for substantially and collectively testing the combined neutralizing effect of the forces of acceleration and gravity on the inner ear of the subject being tested during space flight.

Another object of the invention provides a space flight simulator device utilizing a sensor device for initially simulating the disorientation effect of an approach to zero gravity as applied on the inner ear of man and subsequently substantially counteracting an opposite force prevailing during space flight to reduce the hazards involved.

Other objects and advantages of the invention will become apparent from the following description, taken in connection with the accompanying drawings, in which like reference characters refer to like parts in the several figures.

FIG. 1 is a somewhat schematic, partially broken away cross-sectional view of the zero gravity sensor of the present invention illustrating the use thereof as combined with a centrifuge device mounted within a space chamber.

FIGS. 2–5, respectively, illustrate various positions during rotation of the zero gravity sensor device of the invention with the man to be tested shown suspended therein.

FIGS. 6–9, inclusive, are diagrammatic views of the forces acting on the inner ears of the man being tested while rotated to the various positions of FIGS. 2–5, respectively.

FIG. 10 is another diagrammatic view of the forces acting on the inner ears of a man while lying on his back.

FIG. 11 is still another diagrammatic view illustrating the change in direction of the various resultant forces of the forces of gravity and centrifugal force applied on the inner ears of the man illustrated in FIGS. 2–5 during rotation of the zero gravity sensor device of the invention.

FIG. 12 is a top view of the combined centrifuge and zero gravity sensor device of FIG. 1 illustrating additional details of the relationship therebetween.

FIG. 13 is an additional diagrammatic view indicating the $g$ load on the inner ears of the man illustrated in FIGS. 2–5 resulting from the centrifugal force applied thereto by the centrifuge and the effect thereon by the $g$ load applied thereto by the zero gravity sensor device of the invention.

FIG. 14 is another diagrammatic view illustrating the rhythmic changes in direction and magnitude of the $g$ load and Coriolis forces on the inner ears in transverse and longitudinal relation to the body of the man being tested.

Figure 1:
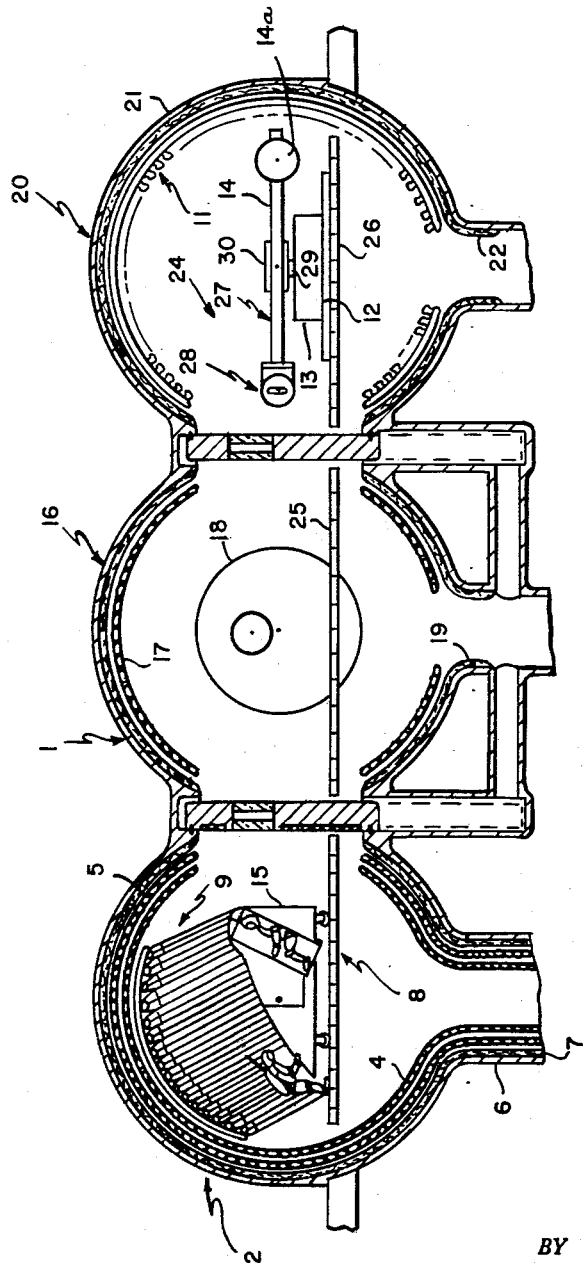

Referring specifically to FIG. 1 of the drawings, the space flight profile simulator in which the present invention is mounted is indicated generally at 1 and is identical to that disclosed in my copending patent application Serial No. 6,330, filed Feb. 2, 1960. The aforesaid flight profile simulator 1 includes a space chamber section 2 consisting of an inner shell 4, intermediate shell 5 positioned in concentric and spaced relation to said inner shell 4, and an outer chamber wall portion 6 covered with a layer of insulation 7. The aforesaid space chamber section 2 also incorporates a horizontal platform 8 on which platform 8 is disposed a test vehicle indicated at 15 in which are tested the reactions of a pair of space men while clothed in a space suit and subjected both to extremes of solar radiation by means of a solar radiation simulator indicated at 9 as well as those environmental space conditions previously described in the aforesaid copending patent application, Serial No. 6,330, filed Feb. 2, 1960.

The space flight profile simulator 1 utilized for housing the present invention also includes the start and safety chamber section 16 and the heat chamber section 20 all formed as a continuous integral unit. Within start and safety chamber section 16 is incorporated the liquid nitrogen shield 17, main entrance door 18, and horizontal platform 25 for a purpose already described in the aforesaid copending patent application. A layer of insulation is also provided as at 19 on the inner wall surface of chamber section 16. The heat chamber section 20 includes the outer wall surface 21, the interior of which is covered with a layer of insulation 22. A plurality of special heat lamps 11 are positioned within heat chamber section 20 to simulate the extreme temperature conditions to be encountered during flights into outer space.

Within the aforesaid heat chamber section 20 is positioned a horizontal platform 26 on which platform 26 is mounted the combined centrifuge and zero gravity sensor device 24 of the present invention (note FIGS. 1 and 12 of the drawings) which consists of the centrifuge device indicated generally at 27 and the zero gravity sensor device indicated generally at 28. As clearly seen in FIGS. 1 and 12 of the drawings, the aforesaid centrifuge device 27 includes a main centrifuge housing indicated at 13 in which is mounted the centrifuge motor drive means (not shown) and a main centrifuge arm 14 carrying a counterweight 14a and which is preferably at least ten feet in radius and is mounted for rotation on the upper end of the centrifuge motor drive shaft indicated at 29 by means of the centrifuge arm support element 30. The aforesaid centrifuge housing 13 is fixedly supported by the base element 12, in turn, rigidly positioned on platform 26.

Referring particularly to FIG. 12 of the drawings, the zero gravity sensor device 28 of the present invention is indicated clearly as affixed on the end of the previously described centrifuge arm 14 remote from counterweight 14a for rotation therewith. The aforesaid zero gravity sensor device 28 is mounted on the end of arm 14 by means of a U-shaped bracket 23 made integral therewith or affixed thereto in any desirable manner. The aforesaid zero gravity sensor device 28 consists of a box or container 31, preferably cylindrical in shape, in which box or container is positioned the man to be tested in a bed of any suitable soft material, as for example, foam rubber or wadding as indicated at 32, or, alternatively, a salt solution designed to compensate the weight of the man. The aforesaid box or container 31 is supported for rotation about its longitudinal axis by means of a pair of rigid stub shafts 33 affixed to the upper and lower or opposite ends thereof which stub shafts are rotatably supported in the aforesaid U-shaped bracket 23. One of said supporting stub shafts 33 incorporates a driven gear 34, as clearly illustrated in FIG. 12 of the drawings, which gear 34 is interconnected with and driven by a drive motor schematically shown at 35 for a purpose to be described hereinafter in detail.

With specific reference to FIGS. 2–5, inclusive, of the drawings, the prospective space man to be tested is shown at 36 positioned in the already described box or container 31 of the zero gravity sensor device 28 of the subject invention in various positions after being rotated by means of the aforesaid gear and motor 34, 35. Thus, the aforesaid space man 36 is depicted as being rotated from a starting position on his back (FIG. 2) to the left side position (FIG. 3), the face down position (FIG. 4), and, finally, completing one cycle of rotation to the right side position (FIG. 5). The aforesaid plurality of positions of FIGS. 2–5, inclusive, of the drawings are illustrated merely for the purpose of clearly depicting the various positions to which the man to be tested is rotated in the zero gravity sensor device 28 of the present invention and to show the relation thereof to the representative forces acting on the inner ears of the man 36 as shown in detail in FIGS. 6–9, inclusive of the drawings while undergoing such rotation at a given r.p.m.

Specifically referring to FIGS. 6–9, inclusive, the magnitudes and directions of the above-mentioned representative forces acting on the liquid of the labyrinth or inner ears of the space man 36 during rotation of the latter in the aforesaid zero gravity sensor device 28 are shown, respectively, for each of the positions previously referred to above relative to FIGS. 2–5 of the drawings. In connection with the latter, it is pointed out that FIG. 6, for example, represents the force-vector diagram corresponding to the rotated position of FIG. 2 of the drawings. A separate force-vector diagram is shown for both the left and right ears of the space man 36 which, in FIG. 6, represents the on-the-back position of FIG. 2. A resultant force is indicated at "r" which force is the resultant or combined effective force of the centrifugal force or horizontal component thereof as indicated at "c" and the force of gravity or vertical component thereof as indicated at "g" which resultant forces "r" act in the position of FIG. 6 on the liquid in the labyrinth or inner ear of the space man 36 at an angle to the left and right of vertical due to a horizontal component of the centrifugal force indicated at "c" as acting respectively to the left or right or in an outward direction relative to the left and right ears.

In the position of FIG. 7, and corresponding FIG. 3, however, which position represents the left side position of space man 36, it is seen that the centrifugal force "c" acting on the labyrinth or inner ear of the right or upper ear is directed in an upward, vertical direction while being directly opposite to the force of gravity "g." Thus, the resultant force "r" on the labyrinth of the upper or right ear equals the force of gravity "g" less the centrifugal force "c" or, in other words, $r = g - c$. However, when in the aforesaid position of FIGS. 3 and 7 of the drawings, the resultant force "r" of the labyrinth or inner ear of the left or lower ear equals the force of gravity "g" plus the centrifugal force "c" or, in other words, $r = g + c$.

In connection with the position of corresponding FIGS. 4 and 8 of the drawings, the space man 36 is illustrated as rotated to the face-down position in which both the centrifugal force and force of gravity acting on the liquid of the labyrinth or inner ears of both left and right ears are equal but opposite in magnitude to the force relationships hereinbefore described with particular reference to FIGS. 2 and 6 of the drawings. Also, the force relationships illustrated in the right-side position of corresponding FIGS. 5 and 9 of the drawings are likewise equal but opposite in magnitude to that of FIGS. 3 and 7 of the drawings. By comparison, with the man 36 lying quietly on his back as seen in FIG. 10 of the drawings, only the force of gravity "g" is present to act on both ears.

As clearly illustrated in FIG. 11 of the drawings, a diagrammatic view is had for both the left and right ears in which the overall and combined effect of the previously-mentioned resultant forces "r" relative to the liquid of the labyrinth of both inner ears occurring during rotation of a space man 36 through the various positions of FIGS. 2–5, inclusive, of the drawings is clearly depicted. It is seen, therefore, that the aforesaid resultant forces "r" for each of the positions previously described continuously turns or rotates relative to each inner ear or labyrinth during rotation of the man 36 within the zero gravity sensor device 28 of the present invention. Moreover, no certain direction to the aforesaid resultant forces "r" occurs during the above-described rotation except for that caused by a small degree of eccentricity due to the centrifugal force applied thereto. Thus, the continual rotation of the aforesaid space man 36 while positioned within the inventive zero gravity sensor device 28 results in the application of continual rotating resultant forces within the inner ear or labyrinth and, since no certain direction for either the blood or liquid of the aforesaid inner ears are preferred during this rotation and since the forces acting thereon are continually changing in direction, a sense of the normal disorientation condition due to the weightlessness prevalent in certain phases of space travel is substantially duplicated and/or simulated.

Referring again to FIG. 12 of the drawings, the previously described zero gravity sensor device 28 of the invention is shown applied to or combined with the centrifuge device 27 already described. It has been determined that, if man is to survive or, at least, act in an efficient manner during space flights, either in orbit around the earth or in interplanetary travel, it is highly essential that his position within the space vehicle be varied in accordance with a particular predetermined phase of flight. For example, if the previously described space man was fixed in a position facing always to the front of the space vehicle, this would enable the successful withstanding of extreme acceleration forces occurring during the blast-off and early phases of the flight but would prove unsuccessful, for example, in withstanding the extremely high forces of deceleration occurring during the re-entry into the atmosphere phase of the space flight. The aforesaid high deceleration forces would have the same effect as that occurring when one is violently pushed forward in collision of an automobile while travelling at a high rate of speed. This latter problem has now been satisfactorily effected by means of the zero gravity sensor device 28 of the present invention in combination with the previously described centrifuge device 27 in a unique and yet simplified manner as hereinbefore described.

With the above-described zero gravity sensor device 28 applied to the centrifuge device 27 as hereinbefore explained and with the ten foot radius centrifuge arm 14 rotating at approximately 50 r.p.m. and the box or container 31 of the aforesaid zero gravity sensor device 28 simultaneously rotating in a plane at 90° to the plane of rotation of arms 14 at approximately the same 50 r.p.m., the effect of the high g loads to which the space man would normally be subjected when in the centrifuge device per se is substantially reduced by the spinning action of the rotating box or container 31 of the zero gravity sensor device 28 effecting a periodic change in the direction of forces applied thereto. Thus, with the centrifuge device 27 alone, the centrifugal forces acting on the liquid of the labyrinth or inner ears of the space man would be approximately 8.4 g but with the combined centrifuge and zero gravity sensor device of the present invention, the centrifugal forces are reduced to 0.14 g with the space man positioned within the spinning box or container 31. Moreover, the Coriolis force would be approximately 0.28 g and the gravitation force approximately 1 g.

In FIG. 13 of the drawings, a diagrammatic view of the forces acting on the labyrinth or inner ears of the space man during rotation of the aforesaid combined centrifuge and zero gravity sensor device 24 is illustrated. In the aforesaid view, G represents the g load applied to the inner ear as the result of the relatively large centrifugal force (Z) caused by the centrifuge device 27, whereas, c represents the relatively small centrifugal force caused by the spinning box or container 31 of the zero gravity sensor device 28 and the gravitational force ($g$). As has been previously stated, the direction of the aforesaid g load as applied to the labyrinth or inner ear is changing periodically with only a negligible eccentricity and almost constant magnitude to complete a cycle once every 1.2 seconds. This complete time of cycle of constant change in direction relative to the aforesaid g load is equal to that of the zero gravity sensor device 28 taken alone; however, with the latter combined with the centrifuge device 27 as illustrated in FIG. 12 of the drawings, the magnitude of the aforesaid g load increases eight or nine times. In addition to the aforesaid g load acting on the labyrinth or inner ears of the space man, an additional force previously described as the Coriolis force is present. This Coriolis force, which by definition is a deflecting force acting on a body in motion due to the rotation of the earth is, however, a force acting in the direction of the longitudinal axis of the body of the space man being tested while positioned within the zero gravity sensor device 28 of the subject invention. The aforesaid Coriolis force, like that of the g load, is likewise oscillating once every 1.2 seconds.

In FIG. 14 of the drawings, rhythmic changes in the aforesaid Coriolis force and g load force acting on a liquid particle in transverse and longitudinal directions of the body within the labyrinth or inner ear of the space man while positioned within the zero gravity sensor device 28 of the invention are shown. Thus, it is clearly seen that the g load, G, which represents that relatively large force applied to the labyrinth or inner ear as a result of the centrifugal force (Z) of the centrifuge device 27, fluctuates or oscillates between G max., and G min. values during each 1.2 second cycle of operation for the combined centrifuge and zero gravity sensor device 24 of the invention, this fluctuation being in a transverse direction relative to the longitudinal axis of the body of the space man being submitted to test within the now-rotating inventive device. The previously mentioned Coriolis force "C" is depicted schematically by means of the arrows A and B representing, respectively, the direction of the head and feet of the space man and thus indicating its oscillation or back and forth movement during each complete cycle of operation in the direction of the longitudinal axis of the body of the space man. As clearly seen, therefore, the resultant "$r$" equals the algebraic sum of the g load, G, resulting from the centrifugal force (Z) caused by the centrifuge device 27 and the g load, c, resulting from the centrifugal force (c) caused by the zero gravity sensor device 28.

Thus, a new and unique device has been developed by the present invention in which the effect of certain of the conditions to be encountered in space flight, especially that of the tendency towards disorientation of the space man when the condition of zero gravity or weightlessness is approached, is substantially simulated. Moreover, the zero gravity sensor device 28 of the subject invention affords a satisfactory means for enabling the space man to withstand both the extreme forces of acceleration occurring during the blast off and earlier phases of space flight as well as the extremely high deceleration forces encountered during the re-entry phases of space flight. In connection with the latter, the use of the aforesaid zero gravity sensor device 28 in combination with the centrifuge device 27 enables much greater resistance to relatively high "$g$" loads since the direction of these forces is changed periodically through means of rotating the space man around his longitudinal axis and thereby substantially eliminating the effect of Coriolis force. Further, with the combined device of the present invention, the blood in the larger vessels is not forced in one direction only during the entire acceleration and deceleration phases of space travel. In connection with this, the blood in the small vessels and capillaries are substantially unaffected because of this periodic change in direction. Thus, the unique and novel combined centrifuge and zero gravity sensor device 24 of the present invention not only substantially simulates the disorientation effect encountered within the labyrinth or inner ear during a period of approach to zero gravity and/or weightlessness but, in addition, substantially simulates the high g loads encountered in space flight and, at the same time, provides a simple and novel means of substantially counteracting the aforesaid high g loads.

I claim:

1. In a space flight profile simulator device, a combined centrifuge and zero gravity sensor device comprising a centrifuge device including a relatively elongated centrifuge arm disposed for rotation in a horizontal plane and a zero gravity sensor device mounted on one end of said centrifuge arm for rotation therewith, said zero gravity sensor device comprising a U-shaped bracket affixed to said one end of said centrifuge arm, a rigid supporting shaft rotatably positioned on said bracket and extending in transverse relation to said centrifuge arm and a relatively enlarged container affixed to said supporting shaft, and drive means adapted to rotate said container about an axis transverse to that about which said arm rotates at a predetermined speed related to that of said centrifuge arm to counteract the normal tendency towards a disorientation effect resulting from the centrifugal force applied thereto by said centrifuge arm.

2. In a space flight profile simulator, means for simulating the normal disorientation effect on the liquid of the labyrinth or inner ears of a space man during an approach to the weightless condition of zero gravity, said simulating means including a combined centrifuge and zero gravity sensor device comprising a relatively enlarged container adapted to enclose a space man in suspended condition therein and rotatable about an axis oriented in a predetermined plane at a predetermined rotational speed, and a centrifuge device incorporating means adapted to support said container for rotation about an axis oriented in a plane transverse to said predetermined plane and at a predetermined rotational speed corresponding to that of said container to counteract the disorientation effect imposed on said zero gravity sensor device by said centrifuge device.

3. In a space flight profile simulator as in claim 2, said centrifuge device comprising a main centrifuge housing adapted to contain a motor for the centrifuge and including a motor drive shaft, and a relatively elongated centrifuge arm affixed to the free end of said motor drive shaft and rotatable therewith and supporting said container on one end thereof.

4. In a space flight profile simulator as in claim 2, said centrifuge device including a relatively elongated, swinging arm rotatably supported thereon, and a relatively enlarged main supporting bracket affixed to one end of said swinging arm and rotatably supporting said container.

5. In a space chamber system for simulating the environmental conditions of outer space, means simulating an approach to the disorientation effect of zero gravity comprising a combined zero gravity sensor device and rotatably mounted centrifuge means, said centrifuge means mounted on one axis and mounting said zero gravity sensor device on a second axis and adapted to rotate at a predetermined speed about said one axis oriented in a first plane of operation and said zero gravity sensor device positioned on and adapted to rotate in unison with said centrifuge means about said second axis oriented in a second plane of operation and drive means operatively associated with said zero gravity sensor device for driving said zero gravity sensor device about its longitudinal axis at a predetermined speed related to the speed of rotation thereof about a transverse axis by said centrifuge means for counteracting centrifugal force applied to said zero gravity sensor device by said centrifuge means.

6. In a space chamber system as in claim 5, said combined zero gravity sensor device and centrifuge means comprising a centrifuge device including a rotatably mounted, counterweighted and relatively elongated member, a U-shaped bracket made integral with the end of said member remote from its counterweight, and a rotatably mounted test chamber positioned within said bracket and adapted to house a man in suspended relation therein.

7. In a space chamber system as in claim 6, said test chamber being mounted for rotation about an axis oriented in a plane transverse to that of said counterweighted, relatively elongated member.

8. In a space chamber system as in claim 7, and motor means adapted to rotate said test chamber and the man suspended therein at a rotational speed equal to that of said rotatably mounted, counterweighted centrifuge member to counteract the centrifugal force resulting therefrom.

9. A space simulator for substantially reproducing the weightless condition encountered during space flight comprising a combined centrifuge and zero gravity sensor positioned for rotation about transverse axes relative to each other and including a relatively elongated box-like container enlarged to house a space man in suspended condition therein and incorporating rigid supporting means on opposite ends thereof for supporting said container for rotation about its longitudinal axis, first drive means interconnected with said centrifuge for simultaneous operation of said combined centrifuge and zero gravity sensor, and second drive means interconnected with said supporting means for rotating said box-like container at a predetermined speed about its longitudinal axis transverse to the axis of rotation of said centrifuge and in predetermined relation to the speed of rotation of said centrifuge to various positions about its longitudinal axis to simulate the disorientation effect of the forces of gravity and centrifugal force acting on the liquid of the inner ears of the space man adapted to be suspended therein and thereby sense an approach to the actual condition of weightlessness to be encountered during space flight.

10. A space simulator as in claim 9, said box-like container incorporating predetermined soft material therein in which the space man to be tested is bedded while rotating at a predetermined number of revolutions per minute about the longitudinal axis to thereby periodically change the direction of the resultant force of the force of gravity and centrifugal force to simulate the conditions of disorientation associated with flight in outer space.

11. A space simulator as in claim 9, wherein said box-like container may be cylindrical in shape and incorporates a salt solution in which the space man is suspended to compensate his weight.

12. In a space simulator device having a centrifuge device, a test chamber mounted for rotation with said centrifuge device at a first predetermined speed and about its longitudinal axis in transverse relation to the axis of said centrifuge device and at a speed of rotation predeterminately related to that of said centrifuge device and of a size sufficient to house a prospective space man in a position therein with his longitudinal axis corresponding to that of said test chamber, said test chamber containing weight-compensating liquid means in which is positioned a space man in suspended condition, means for rotating both the test chamber and the space man suspended therein about the longitudinal axis at a predetermined rotational speed to thereby simulate the tendency towards a disorientation effect occurring during a simulated approach to the zero gravity condition encountered in space flight, and a pair of supporting stub shafts affixed in oppositely disposed relation to said test chamber and extending exteriorly thereof in alignment with its longitudinal axis, and a main supporting bracket for rotatably supporting said pair of supporting shafts for rotation about the longitudinal axis, said rotating means including motor-drive means in driving engagement with one of said supporting shafts for rotating said test chamber within said main supporting bracket about its longitudinal axis at a constant, predetermined speed to effect a periodic change in direction of $g$ load of substantially constant magnitude as applied to the labyrinth of the inner ears of the space man suspended therein.

References Cited in the file of this patent

FOREIGN PATENTS 929,234     France _____ Dec. 16, 1947